US008917596B2

(12) United States Patent
Rochon

(10) Patent No.: US 8,917,596 B2
(45) Date of Patent: Dec. 23, 2014

(54) AUTOMATIC DISCOVERY AND ENFORCEMENT OF SERVICE LEVEL AGREEMENT SETTINGS

(75) Inventor: Steve Rochon, Brossard (CA)

(73) Assignee: Accedian Networks Inc., Saint-Laurent, Quebec (CA)

( * ) Notice: Subject to any disclaimer, the term of this patent is extended or adjusted under 35 U.S.C. 154(b) by 154 days.

(21) Appl. No.: 13/606,135

(22) Filed: Sep. 7, 2012

(65) Prior Publication Data

US 2014/0071822 A1   Mar. 13, 2014

(51) Int. Cl.
*G01R 31/08* (2006.01)
*H04L 12/28* (2006.01)

(52) U.S. Cl.
USPC ..................... 370/230; 370/395.21

(58) Field of Classification Search
CPC ....... H04L 43/08; H04L 43/022; H04L 45/00; H04L 47/00; H04L 49/00; H04L 2012/5638; H04L 2012/5629; H04L 43/50
USPC ............ 370/241, 242, 468, 395.21, 392, 400, 370/352, 395.4, 230, 231, 232, 235, 236; 709/224, 225, 231
See application file for complete search history.

(56) References Cited

U.S. PATENT DOCUMENTS

| | | | |
|---|---|---|---|
| 7,599,308 B2 * | 10/2009 | Laver et al. | 370/252 |
| 7,876,696 B2 * | 1/2011 | Kotelba | 370/252 |
| 7,958,238 B1 * | 6/2011 | Batz et al. | 709/225 |
| 8,139,485 B2 | 3/2012 | Arseneault et al. | |
| 2008/0130494 A1 | 6/2008 | Kaluskar | |
| 2009/0034596 A1 | 2/2009 | Chen et al. | |
| 2009/0103548 A1 | 4/2009 | Weiss | |
| 2010/0157804 A1 * | 6/2010 | Bugenhagen | 370/235 |
| 2011/0158101 A1 | 6/2011 | Figueira | |

FOREIGN PATENT DOCUMENTS

WO    2009/034450    3/2009

OTHER PUBLICATIONS

Bradner, S. et al. "Benchmarking Methodlogy for Network Interconnect Devices." The Internet Society, Mar. 1999, XP015008327 (32 pages).
Stein, Y. "Y.ethoam—RFC2544 Features." International Telecommunication Union. vol. 5/13, Aug. 29, 2005 (3 pages).
Extended European Search Report mailed Dec. 20, 2013 which issued in European Patent Application No. 13183169.5 (6 pages).
On detecting service violations and bandwidth theft in QoS network domains, Ahsan Habib, et al., CERIAS and Department of Computer Sciences, Purdue University, Aug. 7, 2002 (11 pages).

* cited by examiner

*Primary Examiner* — Hanh N Nguyen
(74) *Attorney, Agent, or Firm* — Nixon Peabody LLP

(57) ABSTRACT

A method of automatically detecting the service level agreement settings in an Ethernet virtual circuit (EVC) carrying user packets comprises generating synthetic packets different from the user packets, on a data path in the EVC at a level sufficiently high to saturate the EVC. This accelerates the detection of actual effective values for the Committed Information Rate (CIR) and the Excess Information Rate (EIR) by triggering traffic shaping devices in the data path to enforce the CIR and EIR settings configured for those devices. A plurality of traffic samples are collected from the data path during a sampling period that is long enough to allow the collection of at least two valid traffic samples, where a valid traffic sample is the amount of user packets measured between two consecutive losses of synthetic packets. The CIR and EIR values enforced by the traffic shaping devices are determined from the collected samples.

20 Claims, 6 Drawing Sheets

AUTOMATIC DISCOVERY AND ENFORCEMENT OF SERVICE LEVEL AGREEMENT SETTINGS

FIELD OF THE INVENTION

This invention is directed towards the detection of service level agreements in an Ethernet virtual circuit environment.

BACKGROUND OF THE INVENTION

A service-level agreement (SLA) is a part of a service contract where the level of service is formally defined. As an example, internet service providers can include service level agreements within the terms of their contracts with customers to define the level(s) of service being sold. In this case the SLA will typically have a technical definition in terms of mean time between failures (MTBF), mean time to repair or mean time to recovery (MTTR), various data rates, throughput, jitter, or similar measurable details.

In an Ethernet Virtual Circuit environment, the enforcement of bandwidth quotas as part of a Service Level Agreement requires administrative efforts to propagate the settings into the devices enforcing the SLA. Adding a new device responsible to verify and enforce the SLA typically requires administrative and management steps before the SLA can be monitored and enforced.

In order for a device to enforce SLA settings, the actual Committed Information Rate (CIR) and the Excess Information Rate (EIR) must be explicitly defined. CIR is the average bandwidth for a virtual circuit guaranteed by an internet service provider to work under normal conditions. At any given time, the bandwidth should not fall below this committed figure. The bandwidth is usually expressed in kilobits per second (kbit/s). Above the CIR, an allowance of burstable bandwidth is often given, whose value can be expressed in terms of additional rate, known as the EIR. The provider guarantees that the connection will always support the CIR rate, and sometimes the EIR rate provided that there is adequate bandwidth. The Peak Information Rate (PIR), which is the CIR plus excess burst rate (EIR), is either equal to or less than the speed of the access port into the network.

When inserting a new device (such as a Network Interface Device or NID) in an existing network to verify and enforce the SLA settings, it is usually required to propagate the CIR and EIR values, adding to the management burden and possibly creating a potential for discrepancies when the CIR and EIR need to be updated for many different devices, each with their respective management interfaces.

The RFC 2544 standard, established by the Internet Engineering Task Force (IETF) standards body, is the de facto methodology that outlines the tests required to measure and prove performance criteria for carrier Ethernet networks. The standard provides an out-of-service benchmarking methodology to evaluate the performance of network devices using throughput, loopback, frame loss and latency tests, with each test validating a specific part of an SLA. The methodology defines the frame size, test duration and number of test iterations. Once completed, these tests provide performance metrics of the Ethernet network under test.

RFC 2544 and other similar standards aimed at detecting a packet loss situation, gradually increase the amount of synthetic traffic generated until a packet loss is detected. This process may take a significant amount of time for each Ethernet Virtual Circuit (EVC) being tested. Packet loss occurs when one or more packets of data travelling across a computer network fail to reach their destination. Packet loss is distinguished as one of the three main error types encountered in digital communications.

SUMMARY OF THE INVENTION

In accordance with one embodiment, a method of automatically detecting the service level agreement (SLA) settings in an Ethernet virtual circuit (EVC) carrying user packets comprises generating synthetic packets different from the user paqckets, on a data path in the EVC at a level sufficiently high to saturate the EVC. This accelerates the detection of actual effective values for the Committed Information Rate (CIR) and the Excess Information Rate (EIR) by triggering traffic shaping devices in the data path to enforce the CIR and EIR settings configured for the traffic shaping devices. A plurality of traffic samples are then collected from the data path during a sampling period that is long enough to allow the collection of at least two valid traffic samples, where a valid traffic sample is the amount of user packets measured between two consecutive losses of synthetic packets. The CIR and EIR values enforced by the traffic shaping devices are then determined from the collected traffic samples.

In one implementation, the CIR and EIR values enforced by the traffic shaping devices are determined by analyzing each valid sample to determine the maximum number of consecutive data bytes in each valid traffic sample, which is the sum of the CIR and EIR, and then subtracting from that sum the smallest number of data bytes in any of the collected sample, which is CIR, to determine the remaining difference, which is EIR. The actual user traffic and the synthetic traffic preferably both comprise data packets.

It is an objective of this embodiment to automatically detect the SLA settings and enforce them once detected. It is also an objective to adjust the SLA settings to changing network conditions without the need to propagate new SLA values to monitoring and enforcement devices. Furthermore, the detection of the SLA settings should be possible at Service Activation and anytime while In Service.

The embodiment allows a device to monitor traffic flows and determine the value of the Committed Information Rate (CIR) and Excess Information Rate (EIR) based on the amount of data that can be measured during a sampling period. In order to obtain the maximum values defined for the CIR and the EIR, it is preferable to generate a high level of traffic in order to trigger other traffic shaping devices in the data path to enforce their CIR and EIR settings, in order to accelerate the detection of the CIR and EIR values already configured for the other devices.

Such an automatic detection is useful for devices such as NIDs when they are installed in a network during the initial activation of the Ethernet service on an EVC. The automatic detection is also of interest for an active EVC where it is desirable to detect the effective CIR and EIR values.

When discovering the effective CIR and EIR values during the activation of an Ethernet service on an EVC, a traffic generator is used (typically another NID) to generate synthetic traffic (instead of user or real traffic to be found once the Ethernet service is activated) at a high enough throughput level to saturate the EVC and trigger the traffic shaping by at least one other device upstream of the device attempting to determine the effective values for the CIR and the EIR. The traffic generator immediately saturates the EVC in order to accelerate the detection of the correct effective values for the CIR and the EIR.

In the embodiment described above, in order to determine the effective values of the CIR and of the EIR, the device performing the detection collects a plurality of samples during a sampling period. The duration of the sampling may be arbitrary, but is long enough to allow the collection of at least two valid samples. The higher the number of samples, the higher the precision of the effective values determined for the CIR and the EIR.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

When activating a new Ethernet Virtual Circuit (EVC), it is useful to be able to determine the overall performance achievable on the EVC and to make sure the actual Committed Information Rate (CIR) and the actual Excess Information Rate (EIR) are in line with the settings configured for other upstream devices (from the point of view of the measuring device, for instance a NID). Once an EVC is in service, it is also desirable to make sure that the actual effective CIR and EIR are still met. Finally, it is desirable to detect any degradation (temporary or permanent) in the EVC performance and to adjust the CIR and EIR values to get the most out of the achievable bandwidth for the EVC.

During a sampling period, a valid sample is defined as the amount of traffic measured between two (2) consecutive packet loss indications. A first packet loss indication will indicate that the CIR and EIR values at an upstream device have reached zero (0) and is used to timestamp the beginning of a first sample. A next packet loss indication will indicate that the CIR and EIR values have once again reached a value of zero (0), indicating that the CIR and EIR buckets have been emptied again. It should be noted that the packet loss that marks the end of a sample also marks the beginning of the next sample.

Once a sampling period is completed, each valid sample is analyzed to calculate the maximum number of consecutive bytes that were received as the sum of the CIR and EIR. The CIR is set to the smallest number of bytes in the samples collected.

The sampling process may be repeated at regular or random intervals to validate the previous calculations and to adjust to changing effective values for the CIR and the EIR. A negative change in the value of the CIR and EIR may be indicative of a network degradation (temporary or permanent), for instance in a wireless (e.g. microwave) network impacted by weather conditions.

The calculated operation values of the CIR and EIR may be reported to (or retrieved by) an external management entity for further use, alerting or reporting.

Figure 1:
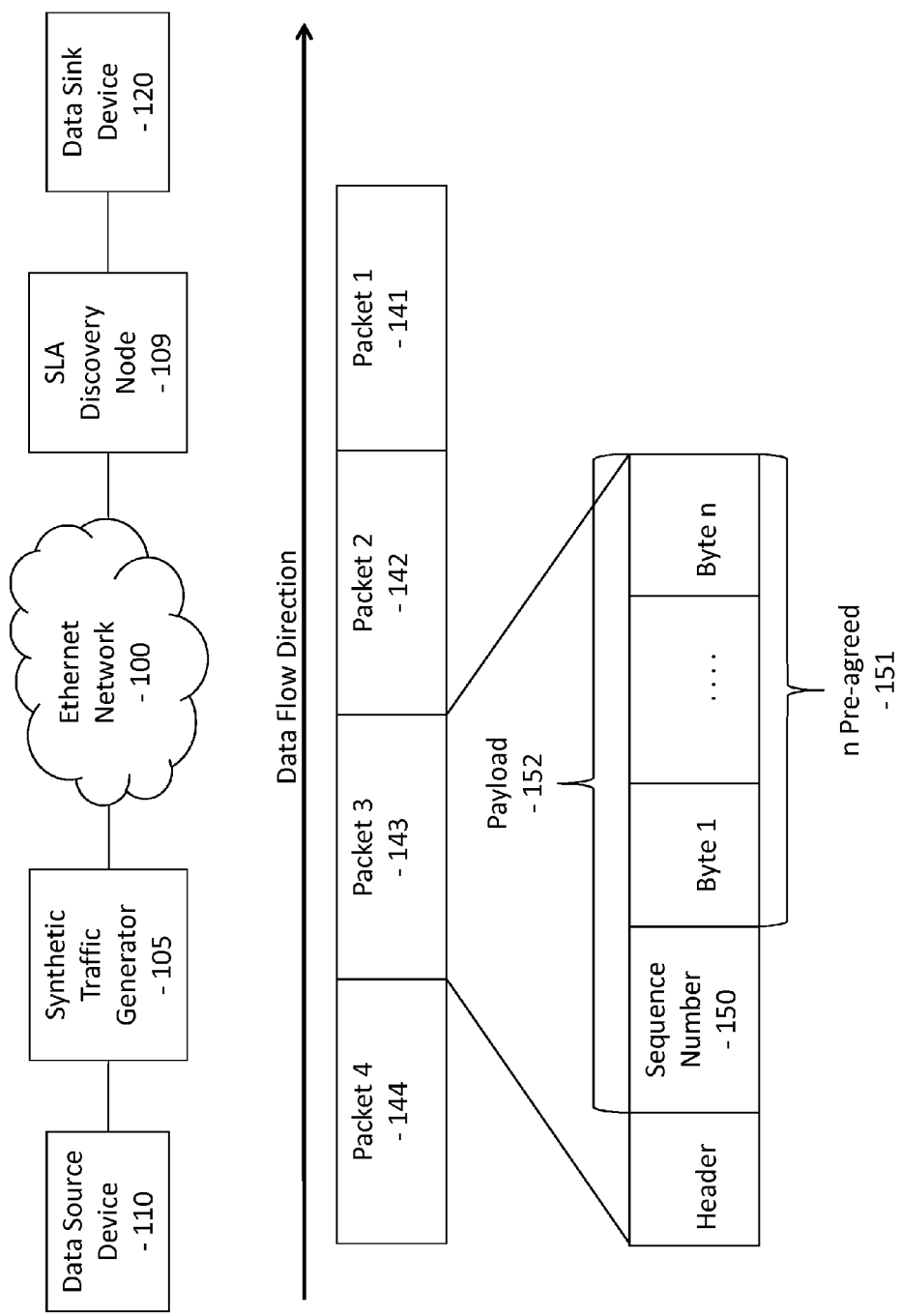
FIG. 1 illustrates a basic ethernet network during the initial activation of an EVC where synthetic traffic is used to determine the effective value of the CIR and EIR.

FIG. 1 is a simple ethernet network 100 with a data source device 110 and a data sink device 120. Between devices 110 and 120, a synthetic traffic generator 105 is installed on the same side as the data source device 110 relative to the position of the Ethernet network 100 and an SLA discovery node 109 is installed on the opposite side relative to the position of the Ethernet network 100 and upstream from the data sink device 120. During the ethernet service activation, a number of synthetic packets (not real user traffic) are generated by device 105 and transmitted at the highest possible rate to the SLA discovery node 109 across the ethernet network 100 with the goal to exceed the CIR and EIR values defined for the bandwidth shaping device or devices installed as part of network 100. Synthetic packets 141, 142, 143 and 144 include a unique and consecutive sequence number 150 and a pre-agreed number of bytes 151 in the payload 152 portion of the synthetic packet. The synthetic packets received by the SLA discovery node 109 are analyzed as part of the determination of the value of the CIR and EIR as further described in this embodiment. After analysis by the SLA discovery node 109, the synthetic packets are discarded.

Figure 2:
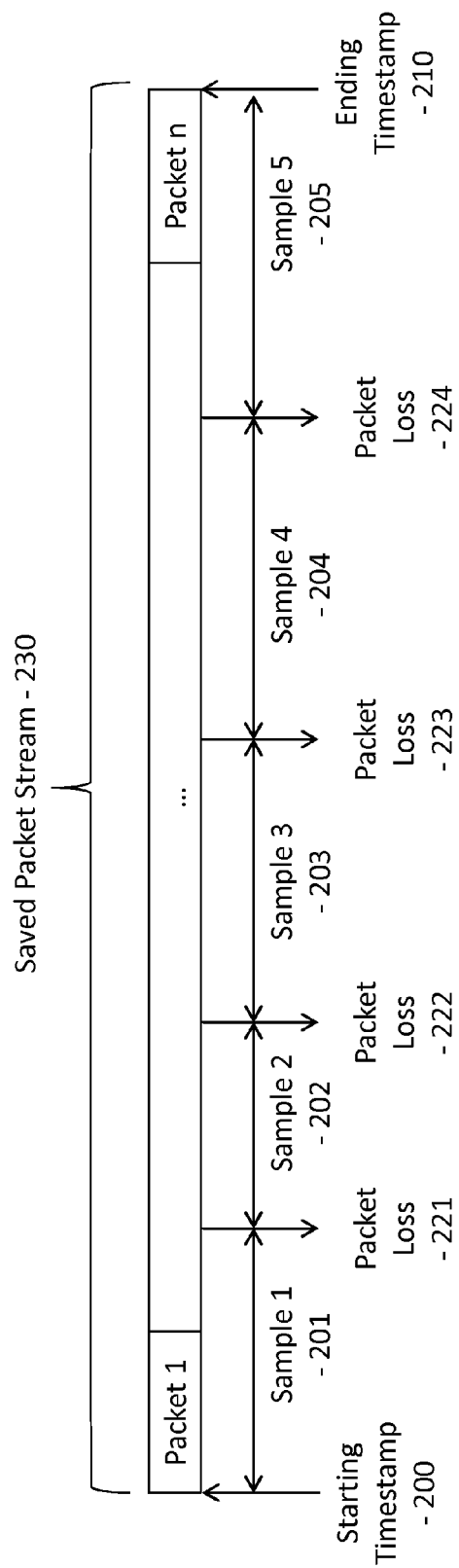
FIG. 2 illustrates a sampling period with a plurality of valid samples.

FIG. 2 illustrates a saved packet stream 230 made up of samples 201, 202, 203, 204, 205 for an arbitrary sampling period beginning on the starting timestamp 200 and ending on the ending timestamp 210. The duration of a sampling period is long enough to collect at least 2 valid samples or more, where a valid traffic sample is the amount of traffic measured between two consecutive losses of synthetic traffic. The higher number of samples collected, the more precise the CIR and EIR. It is preferable to schedule a sampling period (starting timestamp 200 to ending timestamp 210) at regular or random intervals rather than using very large sampling periods. Within the period between starting timestamp 200 and ending timestamp 210, a number of samples are present. Each valid sample begins on a packet loss event and ends on the following packet loss event. Sample 1 201 is invalid since it begins on an arbitrary starting timestamp 200 which cannot be guaranteed to begin on a packet loss event. Sample 2 202 begins on packet loss event 221 and ends on packet loss event 222. The next valid sample 3 203 begins on packet loss event 222 and ends on packet loss event 223. The following sample 4 204 is also valid and begins on packet loss event 223 and ends on packet loss event 224. The last sample 5 205 beginning on packet loss event 224 is invalid because it does not include the next packet loss event since the sampling period terminated (timed out) before the next packet loss event took place.

Figure 3:
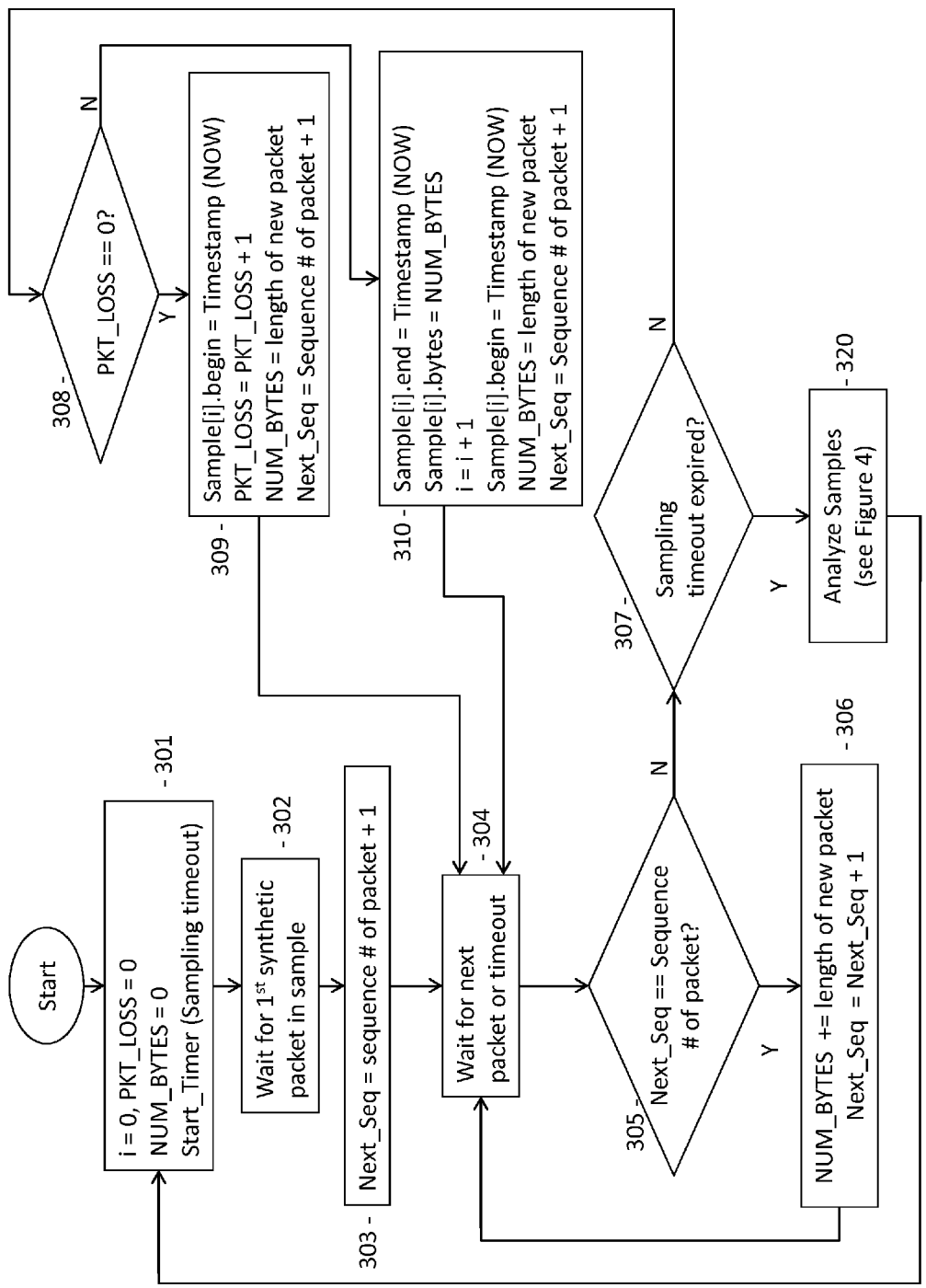
FIG. 3 is a flowchart of the collecting of valid samples during the EVC activation.

FIG. 3 illustrates how samples (201, 202, 203, 204, 205) are collected. For the sampling period (starting on timestamp 200 and ending on timestamp 210), an SLA discovery node 109 will perform the following tasks. During the initialization step 301, a sample index "i" is initialized to zero (0), a packet loss indicator (PKT_LOSS) is set to zero (0), the number of bytes (NUM_BYTES) counter for the current sample is initialized to zero (0) and a sampling timeout is started. The method then proceeds with step 302 to wait for the reception of the first synthetic packet. In step 303, the first packet is exclusively used to obtain the sequence number 150 of the synthetic packet and calculate the value of the next expected synthetic packet (Next_Seq) by incrementing the extracted sequence number by one (1). In step 304, the SLA discovery node 109 waits for the next packet or the end of the sampling period. In step 305, the sequence number 150 of the newly received synthetic packet is verified against the expected sequence number calculated in step 303. If there is a match 306, there is no packet loss and the value of NUM_BYTES is incremented by the number of bytes in the synthetic packet. The expected sequence number (Next_Seq) in incremented by one (1) to help determine if the next synthetic packet is lost. If the validation of the sequence number 150 during step 305 fails, this is indicative of a packet loss and this will mark the boundary of a sample (202, 203, 204, 205). A packet loss condition is determined by a negative result of the check to determine if the sampling period is terminated. If the sampling period is not yet terminated, step 307 will be followed by step 308. Otherwise, if the sampling period is terminated, the analysis of the collected samples will take place as per step 320 which is further illustrated by FIG. 4. Step 308 will determine if the packet loss event is the first one. If this is the first packet loss event, the method proceeds with step 309. As part of step 309, the first packet loss event indicates that the beginning of the first valid sample is detected and a valid sample is created with the beginning value of the sample defined by a timestamp of the current time. The number of bytes for this first valid packet is used to initialize the NUM_BYTES counter for this first sample. The sequence number of the next expected packet (Next_Seq) is also calculated. Finally, the PKT_LOSS indicator is incremented to indicate that the first packet loss event has been detected. This is important since every other packet loss event detected will serve as the end time of the current sample and as the beginning time of the next sample. Looking at step 310, the packet loss event represents the end time of the current sample. The end time of the current sample is set to a timestamp of the current time. The number of bytes in the sample is set to the value of NUM_BYTES counter. The sampling index is then incremented by 1 and the next sample beginning time (Sample[i].begin) is set to a timestamp of the current time. The NUM_BYTES counter is initialized to the number of bytes in the packet that represents the first valid packet in the new sample. The number of samples (Num_Samples) is incremented by one (1). Finally, the sequence number of the next expected packet (Next_Seq) is also calculated by incrementing the sequence number 150 of the current packet by one (1). Once steps 309 or 310 are completed, the sampling process resumes at step 304 to wait for the next packet in the sampling period or the end of the sampling period.

Figure 4:
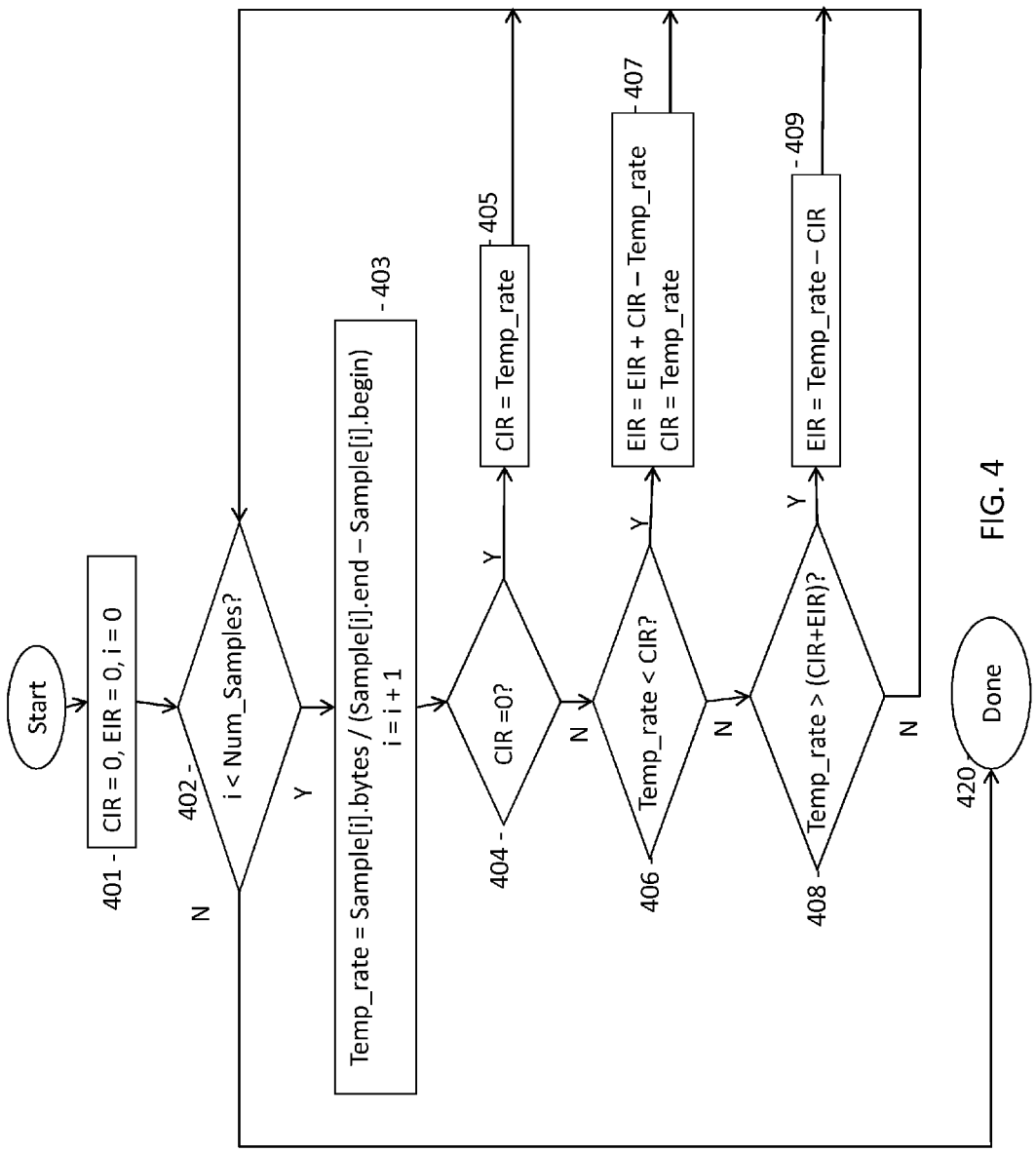
FIG. 4 is a flowchart of the calculation of the effective values of the CIR and EIR.

FIG. 4 illustrates how the collected samples from a packet stream 230 are processed to determine the actual CIR and EIR values. Step 401 resets the CIR and EIR to zero (0) and the index 'i' used to navigate through the set of collected samples is also set to zero (0). Step 402 is used to determine whether the index 'i' has cycled through all of the collected samples. If there are more samples to analyze, the method continues with step 403. Otherwise, when all samples have been analyzed, the CIR and EIR values have been determined and the analysis process is completed (step 420). At step 403, the traffic rate (Temp_rate) for the current sample is obtained by dividing the total number of bytes received in the current sample by the duration of the sample. The duration of the sample is obtained by deducting the starting timestamp from the ending timestamp for the sample. The sample index 'i' is then incremented by 1 to be ready to process the next sample (if any). At step 404, a check is made if this is the first sample to be analyzed from the sampling period. A CIR of zero (0) will be indicative of this condition. If this is the first sample, the next step will be step 405. Otherwise, this is not the first sample and the next step will be step 406. During step 405, the CIR value is set to the Temp-rate value calculated for the current sample. Processing then continues with step 402. During step 406, the rate of the current sample (Temp_rate) is verified against the current value of the CIR. If Temp_rate is lower than the CIR, the next step 407 is used to adjust the EIR as the previous value of the EIR plus the value of the CIR minus the value of Temp_rate. Basically, the previously larger value of CIR (when compared against the current Temp_rate) actually included some packets that were in excess of the CIR and therefore allowed based on the value of the EIR. Step 407 will then set the CIR to the value of the Temp_rate and processing will resume at step 402. Otherwise, if the Temp_rate is not lower than the CIR, processing will move to step 408. At step 408, the Temp_rate value is compared to the sum of the CIR and EIR. If it is greater, processing moves to step 409. Otherwise, if it is lower, the analysis of the current sample is completed and processing moves to step 402. At step 409, the value of EIR needs to be adjusted upward since the larger Temp_rate value representing a higher traffic rate indicates that more traffic was allowed by a larger value of EIR. The value of EIR is obtained by subtracting the value of CIR from the value of Temp_rate.

Figure 5:
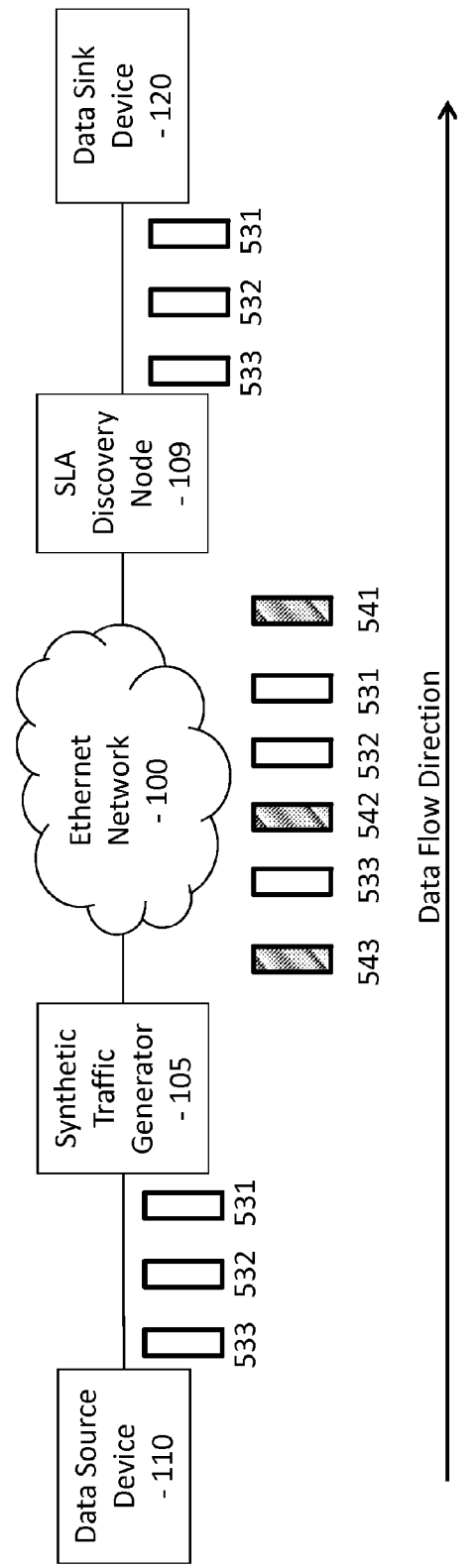
FIG. 5 illustrates a basic ethernet network for an active EVC where synthetic traffic is added to user traffic to determine the effective value of the CIR and EIR.

FIG. 5 is a replication of FIG. 1 for an ethernet network that is now in service and may therefore carry user traffic. In this figure, synthetic packets 541, 542, and 543 also have a unique and consecutive sequence number and a pre-agreed number of bytes in the payload portion of the synthetic packet. The user packets and the synthetic packets received by device 109 are analyzed as part of the determination of the value of the CIR and EIR as further described in this disclosure (see FIG. 6). After analysis by SLA discovery node 109, the synthetic packets are discarded by SLA discovery node 109. User packets 531, 532 and 533 are also used to determine the real value of the CIR and EIR but are then forwarded toward the data sink device 120 by SLA discovery node 109. Since only Synthetic packets 541, 542 and 543 carry a sequence number 150 usable for the purpose of detecting a packet loss condition, user packets will never be used to detect a packet loss condition.

Figure 6:
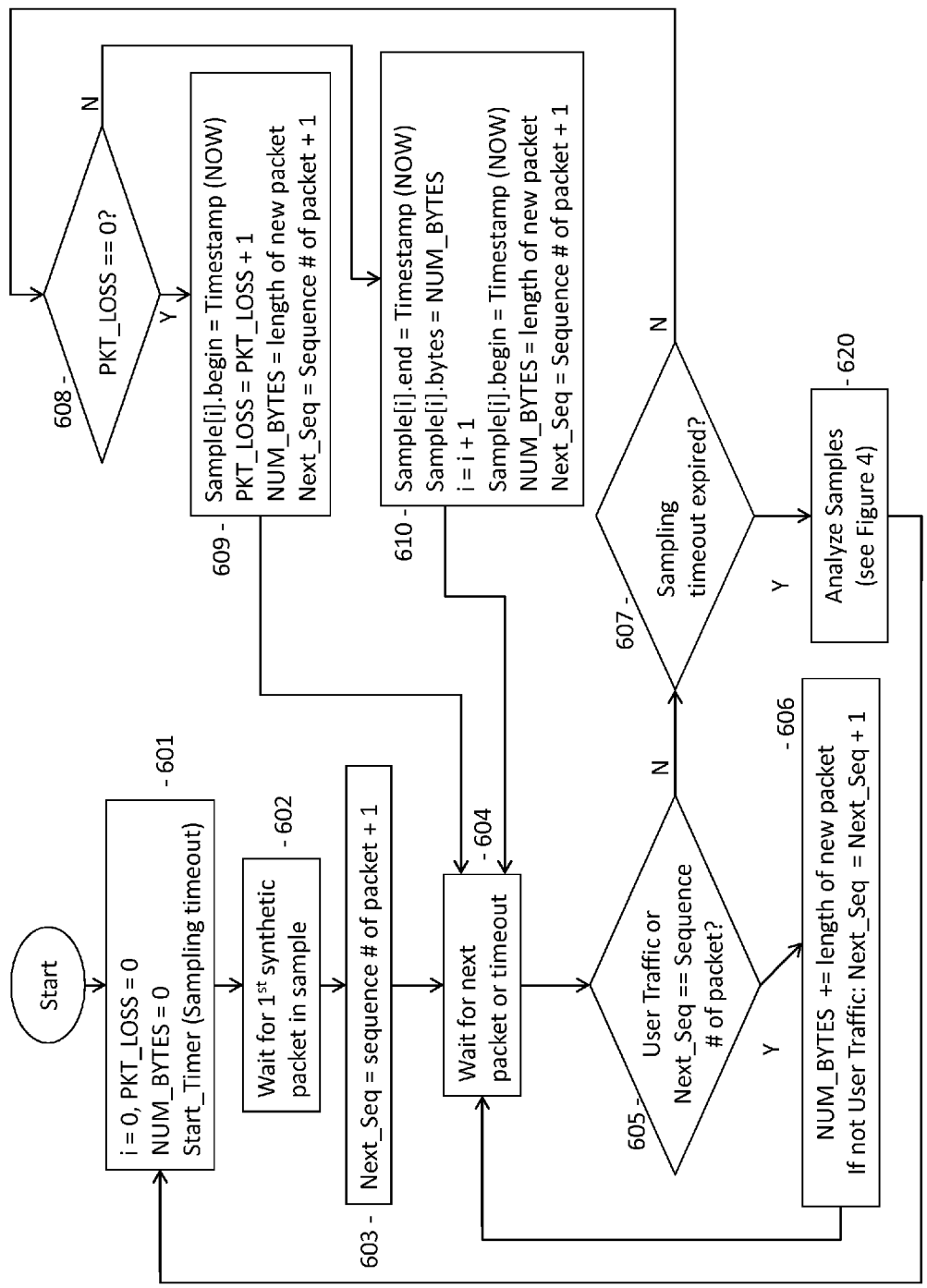
FIG. 6 is a flowchart of the collecting of valid samples for an active EVC made up of user and synthetic packets.

FIG. 6 is an extension of the method described by FIG. 3 and illustrates how, for an In Service ethernet network 100, samples (201, 202, 203, 204, 205) made up of user packet and of synthetic packets are collected. For the sampling period (starting on timestamp 200 and ending on timestamp 210), an SLA discovery node 109 will perform the following tasks. During the initialization step 601, a sample index "i" is initialized to zero (0), a packet loss indicator (PKT_LOSS) is set to zero (0), the number of bytes (NUM_BYTES) counter for the current sample is initialized to zero (0) and a sampling timeout is started. The method then proceeds with step 602 to wait for the reception of the first synthetic packet (a user packet does not carry a usable sequence number and cannot be used to detect a packet loss condition). In step 603, the first synthetic packet 541 is exclusively used to obtain the sequence number of the synthetic packet and calculate the value of the next expected synthetic packet (Next_Seq) by incrementing the extracted sequence number by one (1). In step 604, the SLA discovery node 109 waits for the next packet (user or synthetic) or the end of the sampling period. In step 605, there is a check to determine if it is a user packet or, in the case of a synthetic packet, if the sequence number 150 of the newly received synthetic packet matches the expected sequence number calculated in step 603. If there is a match or it is a user packet, there is no packet loss and the value of NUM_BYTES is incremented by the number of bytes in the packet (user or synthetic). If it is not a user packet, the expected sequence number (Next_Seq) in incremented by one (1) to help determine if the next synthetic packet is lost. If the validation of the sequence number 150 during step 605 fails, this is indicative of a packet loss and this will mark the boundary of a sample. A packet loss condition is determined by a negative result of the check to determine if the sampling period is terminated. If the sampling period is not yet terminated, step 607 will be followed by step 608. Otherwise, if the sampling period is terminated, the analysis of the collected samples will take place as per step 620 which is further illustrated by FIG. 4. Step 608 will determine if the packet loss event is the first one. If this is the first packet loss event, the method proceeds with step 609. As part of step 609, the first packet loss event indicates that the beginning of the first valid sample is detected and a valid sample is created with the beginning value of the sample defined by a timestamp of the current time. The number of bytes for this first valid packet is used to initialize the NUM_BYTES counter for this first sample. The sequence number of the next expected packet (Next_Seq) is also calculated. Finally, the PKT_LOSS indicator is incremented to indicate that the first packet loss event has been detected. This is important since every other packet loss event detected will serve as the end time of the current sample and as the beginning time of the next sample. Looking at step 610, the packet loss event represents the end time of the current sample. The end time of the current sample is set to a timestamp of the current time. The number of bytes in the sample is set to the value of NUM_BYTES counter. The sampling index is then incremented by 1 and the next sample beginning time (begin) is set to a timestamp of the current time. The NUM_BYTES counter is initialized to the number of bytes in the packet that represents the first valid packet in the new sample. Finally, the sequence number of the next expected packet (Next_Seq) is also calculated by incrementing the sequence number 150 of the current packet by one (1). Once steps 609 or 610 are completed, the sampling process resumes at step 604 to wait for the next packet in the sampling period or the end of the sampling period.

When calculating the real value of the Committed Information Rate (CIR) and of the Excess Information Rate (EIR), the analysis method may save the previously calculated values of the CIR and EIR (as obtained from a previous sampling period) and report any variation of the CIR and EIR to a management entity. A positive variation of the CIR would be indicative of an improvement of the performance of the network. A negative variation of the CIR would be indicative of a degradation of the performance of the network.

This invention may be used in a network that may suffer important and relatively long outage and/or reduction in throughput due to adverse conditions. For instance, this is the case when microwave radio modules are used to backhaul traffic for a cellular network or an Internet service and the radio link is disrupted by heavy rain or snow. Once the weather conditions improve, the microware service will usually revert back to its normal throughput, but for the duration of the impairment, the value of the CIR and EIR defined in upstream devices may be pointless since they may be unachievable due to the degradation of the throughput of the microwave link.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of automatically detecting service level agreement (SLA) settings comprising committed information rate (CIR) and excess information rate (EIR) settings for a data path originating at a data source and terminating at a data sink, said data path carrying user packets and comprising traffic shaping devices configured with said CIR and EIR settings in accordance with said SLA, said method comprising generating synthetic packets, different from the user packets, on said data path at a level that exceeds the CIR and EIR settings configured for the traffic shaping devices in said data path, said generating used to accelerate detection of actual values for CIR and EIR by triggering the traffic shaping devices in said data path to enforce, in accordance with said SLA, the CIR and EIR settings configured for said traffic shaping devices, collecting a plurality of traffic samples from said data path during a sampling period that is long enough to allow the collection of at least two valid traffic samples, wherein each valid traffic sample corresponds to an amount of user packets measured between two consecutive losses of synthetic packets, further wherein each of said valid traffic samples begins on a corresponding first packet loss indication and terminates on a corresponding second packet loss indication and includes a count of the total number of bytes received for the period between a pair of successive packet loss indications, and determining from the collected traffic samples the actual CIR and EIR values enforced by said traffic shaping devices.

2. The method of claim 1 in which said CIR and EIR values are determined by analyzing each valid sample to determine a sum of the actual CIR and EIR based on the maximum number of consecutive data bytes within each valid traffic sample, and then subtracting, from the sum, the actual CIR based on the smallest number of data bytes in any of the collected samples, to obtain the actual EIR.

3. The method of claim 1 further comprising determining the value of the CIR and EIR settings.

4. The method of claim 1 in which said SLA settings are detected during service activation of an Ethernet service associated with said data path.

5. The method of claim 1 in which said SLA settings are detected during in-service operation of an Ethernet service associated with said data path.

6. The method of claim 1 in which said sampling period is bound by a starting sampling timestamp and an ending sampling timestamp.

7. The method of claim 6 in which the calculated traffic rate of a valid traffic sample is determined by dividing the total number of bytes received during said traffic sample by the difference between an end timestamp of said valid traffic sample and a begin timestamp of said valid traffic sample.

8. The method of claim 1 in which said count of the total number of bytes received is based on a sum of lengths in bytes of all user packets and synthetic packets received in said valid sample.

9. The method of claim 1 in which said synthetic packets include sequence numbers, and at least one of the corresponding first and second packet loss indications is determined by comparing the sequence number in a synthetic packet against an expected sequence number calculated as the value of the sequence number of the previous synthetic packet incremented by one.

10. The method of claim 1 in which said corresponding second packet loss indication is used as an end timestamp of a current traffic sample and where the same packet loss indication is used as a begin timestamp of the next traffic sample.

11. The method of claim 1 in which said valid traffic sample includes:
   a begin timestamp taken after the starting sampling timestamp of said sampling period, and
   an end timestamp taken before the end sampling timestamp of said sampling period.

12. The method of claim 1 in which said calculated values of the CIR and the EIR are obtained by:
   setting the value of the CIR of said sampling period to zero,
   setting the value of the EIR of said sampling period to zero, and
   analyzing the collected valid traffic samples obtained for the said sampling period.

13. The method of claim 1 in which the calculated values of the CIR and the EIR for said sampling period are obtained by:
   determining whether the calculated value of the CIR is equal to zero and if it is, setting the value of the CIR to the value of the calculated traffic rate for the current traffic sample being analyzed;
   otherwise, determining if the calculated traffic rate for said traffic sample is less than the calculated value of the CIR and if it is, calculating the effective value of the EIR by adding the value of the CIR to the value of the EIR and deducting the value of the calculated traffic rate for the current traffic sample being analyzed, and setting the value of the CIR to the value of the calculated traffic rate for said traffic sample;
   otherwise, if the calculated traffic rate for said traffic sample is larger than the sum of the effective CIR and of the EIR, adjusting the effective value of the EIR for the said sampling period to the difference between the effective data rate for said sample and the effective CIR for said sampling period.

14. A method of automatically detecting service level agreement (SLA) settings comprising committed information rate (CIR) and excess information rate (EIR) settings for a data path originating at a data source and terminating at a data sink, said data path carrying user packets and comprising traffic shaping devices configured with said CIR and EIR settings in accordance with said SLA, said method comprising
   generating synthetic packets, different from the user packets, on said data path at a level that exceeds the CIR and EIR settings configured for the traffic shaping devices in said data path, said generating used to accelerate detection of actual values for CIR and EIR by triggering the traffic shaping devices in said data path to enforce, in accordance with said SLA, the CIR and EIR settings configured for said traffic shaping devices,
   collecting a plurality of traffic samples from said data path during a sampling period that is long enough to allow the collection of at least two valid traffic samples, wherein each valid traffic sample corresponds to an amount of user packets measured between two consecutive losses of synthetic packets, where said sampling period is bound by a starting sampling timestamp and an ending sampling timestamp; and
   determining the calculated traffic rate of a valid traffic sample by dividing the total number of bytes received during the said traffic sample by the difference between an end timestamp of said valid traffic sample and a begin timestamp of said valid traffic sample.

15. The method of claim 14 in which said CIR and EIR values are determined by analyzing each valid sample to determine a sum of the actual CIR and EIR based on a maximum number of consecutive data bytes in each valid traffic sample, and then subtracting, from the sum, the actual CIR based on the smallest number of data bytes in any of the collected samples, to obtain the actual EIR.

16. The method of claim 14 in which
   said begin timestamp is taken after the starting sampling timestamp of said sampling period, and
   said end timestamp is taken before the ending sampling timestamp of said sampling period.

17. The method of claim 14 in which said SLA settings are detected during service activation of an Ethernet service associated with said data path.

18. The method of claim 14 in which said SLA settings are detected during in-service operation of an Ethernet service associated with said data path.

19. A method of automatically detecting service level agreement (SLA) settings comprising committed information rate (CIR) and excess information rate (EIR) settings for a data path originating at a data source and terminating at a data sink, said data path carrying user packets and comprising traffic shaping devices configured with said CIR and EIR settings in accordance with said SLA, said method comprising
   generating synthetic packets, different from the user packets, on said data path at a level that exceeds the CIR and EIR settings configured for the traffic shaping devices in said data path, said generating used to accelerate detection of actual values for CIR and EIR by triggering the traffic shaping devices in said data path to enforce, in accordance with said SLA, the CIR and EIR settings configured for said traffic shaping devices,
   collecting a plurality of traffic samples from said data path during a sampling period that is long enough to allow the collection of at least two valid traffic samples, wherein each valid traffic sample corresponds to an amount of user packets measured between two consecutive losses of synthetic packets, where said sampling period is bound by a starting sampling timestamp and an ending sampling timestamp; and
   determining from the collected traffic samples the actual CIR and EIR values enforced by said traffic shaping devices, wherein said determining is performed by analyzing each valid sample to determine a sum of the actual CIR and EIR based on a maximum number of consecutive data bytes in each valid traffic sample, and then subtracting, from the sum, the actual CIR based on the smallest number of data bytes in any of the collected samples, to obtain the actual EIR.

20. The method of claim 19 further comprising determining the value of the CIR and EIR settings.

* * * * *